////United States Patent Office

3,351,636
Patented Nov. 7, 1967

3,351,636
20 - (ALIPHATIC HYDROCARBONOXY)- AND 20-(SUBSTITUTED ALIPHATIC HYDROCARBONOXY) - PREGNENE - 11 - OXYGENATED-3-ONES
Mariano A. Guiducci, Edison, and Paul P. Lemanski, Nixon, N.J., assignors to E. R. Squibb & Sons, Inc., New York, N.Y., a corporation of Delaware
No Drawing. Filed Apr. 25, 1966, Ser. No. 544,699
6 Claims. (Cl. 260—397.1)

This invention relates to the synthesis of steroids, and has for its object the provision of a new class of physiologically active steroids, which may be represented by the formula

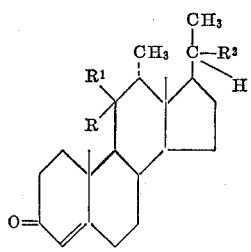

wherein $R^2$ is selected from the group consisting of hydroxyalkoxy, acyloxyalkoxy and carboxylalkoxy; R is hydrogen, $R^1$ is B—OH and R and $R^1$ together are oxo (O=).

The preferred acyl radicals of this invention are those of hydrocarbon carboxylic acids of less than twelve carbon atoms, as exemplified by the lower alkanoic acids (e.g., acetic, propionic, butyric and tert-pentanoic acids), the lower alkenoic acids, the monocyclic aryl carboxylic acids (e.g., benzoic and toluic acids), the monocyclic aryl lower alkanoic acids (e.g., phenylacetic and β-phenylpropionic acids), the cycloalkane carboxylic and the cycloalkene carboxylic acids.

The compounds of the invention are useful as intermediates or antibacterial agents. They can be administered in a range of 0.1 mg. to 100 mg. per kg. of patient weight. But generally it is preferred to administer the compounds of this invention in a manner known to the art. Thus, the novel compounds of this invention may be formulated for such administration, the concentration and/or dosage being based on the activity of the particular compound and the requirements of the patient.

The final products of this invention are prepared by the process of this invention which entails a number of steps beginning with 12α-methyl-11-ketoprogesterone-3,20-bisethylene ketal (Compound A) as a starting material.

The following formulae illustrate the process of the invention:

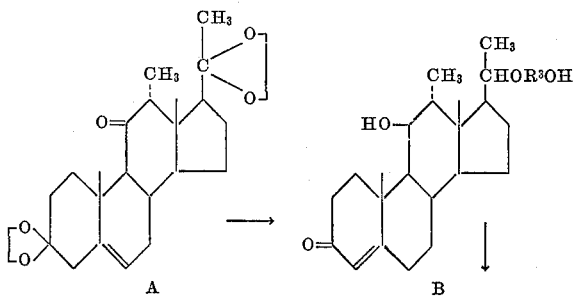

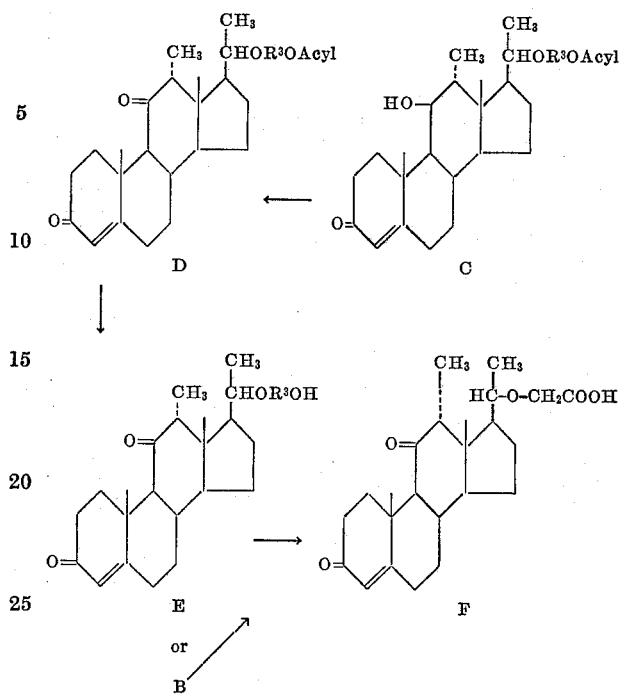

wherein $R^3$ is alkylene.

The bisketal (Compound A) of the invention is reduced as by treatment with lithium aluminum hydride to form the 20-hydroxy derivative of the invention wherein $R^3$ is ethylene (Compound B). This product may be acylated by reacting it with an acid anhydride in the presence of an organic base such as pyridine to form Compound C which in turn may be reacted with an oxidizing agent such as Smith's reagent, i.e., chromic acid sulfuric acid reagent to yield the 3,11-diketo intermediate of the instant invention (Compound D). Compound D may then be deacylated as by treatment with an inorganic basic solution, e.g., potassium hydroxide or sodium hydroxide, to form an end product of the invention (Compound E). Oxidation of Compounds B or E with chromic acid yields a new compound of the instant invention, Compound F.

The following examples illustrate the instant invention. All temperatures are in degrees centigrade unless otherwise stated:

Example 1.—*12α-methyl-20ξ-(2'-hydroxyethoxy)-pregn-4-ene-3-one-11β-ol*

The crude product from the lithium aluminum hydride reduction of 12α - methyl-11-ketoprogesterone-3,20-bisethylene ketal and subsequent acid hydrolysis as described in U.S. Patent No. 3,151,135 is chromatographed on acid alumina. Elution with 10:1 and 5:1 benzene:chloroform yields 12α - methyl - 11β - hydroxy - 20α - (2 - hydroxy ethoxy)-pregn-4-ene-3-one as the main product, while elution with 3:1, 2:1 and 1:1 benzene:chloroform yields 12α - methyl - 11α - hydroxy - 20β - (2 - hydroxy ethoxy)-pregn-4-ene-3-one. Further elution with chloroform yields the product. Crystallization from aqueous ethanol gives fine needles with a melting point of 202–204° C., $[\alpha]_D^{23.5}$ +119° (CHCl₃, c. 1.07), λ alc, max. 243 mμ (ε=15,300), λ nujol, max. 2.9, 6.02, 6.20, 9.0, 9.6μ, NMR (CDCl₃) methyl singlets at 9.08, 8.94 and 8.57τ, methyl doublet at 8.93τ, vinyl singlet at 4.33τ, methylene at 6.2–6.8τ, triplet proton at 6.01 and multiplet at 6.65τ.

*Analysis.*—Calc'd for $C_{24}H_{38}O_4$ (390): C, 73.80; H, 9.81. Found: C, 73.73; H, 9.64.

Example 2.—12α-methyl-20ξ-(2'-acetoxyethoxy)-pregn-4-ene-3-one-11β-ol

A solution of 1 g. of 12α - methyl - 20ξ - (2'-hydroxyethoxy)-pregn-4-ene-3-one-11β-ol in 10 ml. of pyridine and 5 ml. of acetic anhydride is stirred at room temperature for eighteen hours. After addition of ice, the precipitate is filtered and washed thoroughly with water. Recrystallization from acetone-hexane yields needles with the following properties: M.P. 162–163° C., $[\alpha]_D^{23.3°}$ +114° (CHCl₃, c. 1.00), λ alc, max. 243 mμ (ε=16,000); λ nujol, max. 2.9, 5.75, 6.05, 6.20, 8.1, 9.0 and 9.45μ, NMR (CDCl₃): methyl singlets at 8.96, 8.57 and 7.94τ, methyl doublets at 9.10 and 8.94τ, vinyl proton at 4.34τ, methylene at 6.0–6.8 and 5.8τ.

*Analysis.*—Calc'd for $C_{26}H_{40}O_5$ (432): C, 72.19; H, 9.32. Found: C, 71.99; H, 9.26.

Example 3.—12α-methyl-20ξ-(2'-acetoxyethoxy)-pregn-4-ene-3,11-dione

To a solution of 9 g. of 12α - methyl-20ξ-(2'-acetoxyethoxy)-pregn-4-ene-3-one-11β-ol in 200 ml. of acetone cooled with an ice water bath is added 18 ml. of chromic acid-sulfuric acid reagent. After the solution is stirred for one hour, isopropyl alcohol is added to destroy the excess oxidizing solution. Upon addition of water a precipitate forms. After filtration and thorough rinsing, the precipitate is recrystallized from acetone-hexane yielding fine crystals with the following characteristics: M.P. 122–124° C., $[\alpha]_D^{23.4}$ +139° (CHCl₃, c. 1.05), λ alc, max. 236 mμ (ε=15,800); λ nujol, max 5.75, 5.90, 6.05, 6.2, 8.02, 8.12, 9.45 and 11.5μ, NMR (CDCl₃): methyl singlets at 9.26, 8.58 and 7.87τ, methyl doublets at 8.94, and 8.92τ, vinyl proton at 4.34, methylenes at 5.88 and 6.59τ, multiplets at 7.31 and 6.72τ.

*Analysis.*—Calc'd for $C_{26}H_{38}O_5$ (430): C, 72.52; H, 8.90. Found: C, 72.46; H, 8.91.

Example 4.—12α-methyl-20ξ-(2'-hydroxyethoxy)-pregn-4-ene-3,11-dione

A solution of 547 mg. of 12α - methyl-20ξ-(2'-acetoxyethoxy)-pregn-4-ene-3,11-dione in 25 ml. of methanol and 5 ml. of 5% methanolic potassium hydroxide solution is stirred for eighteen hours at room temperature. After neutralization with dilute hydrochloric acid solution the methanol is removed under reduced pressure. Water is then added and the aqueous solution extracted with chloroform. The combined chloroform extracts are washed with salt solution, dried on sodium sulfate and concentrated. Recrystallization of the crude residue from acetone-hexane yields needles with the following properties: M.P. 198–199° C., λ nujol 2.85, 5.9, 6.02, 6.20, 8.9, 9.4, 10.55 and 11.55μ.

Example 5.—12α-methyl-20ξ-(carboxymethoxy)-pregn-4-ene-3,11-dione

A solution of 1 g. of 12α - methyl - 20ξ - (2'-hydroxyethoxy)-pregn-4-ene-3-one-11β-ol in 25 ml. of acetone cooled with an ice water bath is oxidized with 2 ml. of 8 N chromic acid solution. After the solution is stirred for one hour, isopropyl alcohol is added to destroy the excess acid. Water is added and the resultant precipitate is filtered and washed thoroughly with water. Recrystallization from acetone-hexane yields crystalline product with the following properties: M.P. 203–205° C., $[\alpha]_D^{23.6}$ +138° (CHCl₃, c. 0.99), λ alc, max. 236 mμ (ε=17,400), λ nujol, max. 3.5, 5.82, 5.90, 6.15, 8.22, 8.85, 10.05 and 11.45μ, NMR (CDCl₃) methyl singlets at 8.59 and 9.22τ, methyl doublets at 8.90 and 8.87τ, vinyl proton at 4.29τ, methylene at 5.97τ and multiplets at 7.18 and 6.61τ.

*Analysis.*—Calc'd for $C_{24}H_{34}O_5$ (402): C, 71.61; H, 8.51. Found: C, 71.84; H, 8.49.

The invention may be variously otherwise embodied within the scope of the appended claims.

What is claimed is:
1. A compound of the formula

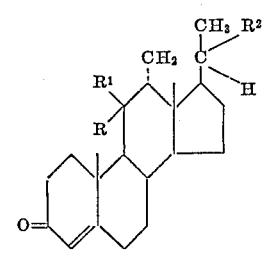

wherein R² is selected from the group consisting of hydroxyalkoxy, acyloxyalkoxy and carboxylalkoxy; R is hydrogen, R¹ is β—OH and R and R¹ together are oxo (O=).

2. A compound in accordance with claim 1 having the name 12α - methyl - 20ξ - (2'-hydroxyethoxy) - pregn - 4-ene-3-one-11β-ol.

3. A compound in accordance with claim 1 having the name 12α - methyl - 20ξ - (2' - acetoxyethoxy) - pregn - 4-ene-3-one-11β-ol.

4. A compound in accordance with claim 1 having the name 12α - methyl - 20ξ - (2' - acetoxyethoxy) - pregn-4-ene-3,11-dione.

5. A compound in accordance with claim 1 having the name 12α - methyl - 20ξ - (2' - hydroxyethoxy) - pregn-4-ene-3,11-dione.

6. A compound in accordance with claim 1 having the name 12α - methyl - 20ξ - (carboxymethoxy) - pregn-4-ene-3,11-dione.

References Cited
UNITED STATES PATENTS 3,176,028  3/1965  Cross _____ 260—397.1

OTHER REFERENCES

Cross et al.: "Steroid" (1965), pp. 585–590 relied on.

ELBERT L. ROBERTS, *Primary Examiner.*

UNITED STATES PATENT OFFICE

CERTIFICATE OF CORRECTION

Patent No. 3,351,636
November 7, 1967

Mariano A. Guiducci et al.

It is hereby certified that error appears in the above numbered patent requiring correction and that the said Letters Patent should read as corrected below.

Column 1, line 27, for "are" read -- is --; column 4, lines 21 to 31, for that portion of the formula reading "$CH_2$" read -- $CH_3$ --; line 37, for "are" read -- is --.

Signed and sealed this 26th day of November 1968.

(SEAL)
Attest:

Edward M. Fletcher, Jr.
Attesting Officer

EDWARD J. BRENNER
Commissioner of Patents